July 2, 1957 G. O. BENSON ET AL 2,797,475
METHOD AND APPARATUS FOR APPLYING CYLINDRICAL SHEET
METAL FITTINGS TO TAPERED RODS
Filed Sept. 16, 1953 3 Sheets-Sheet 1
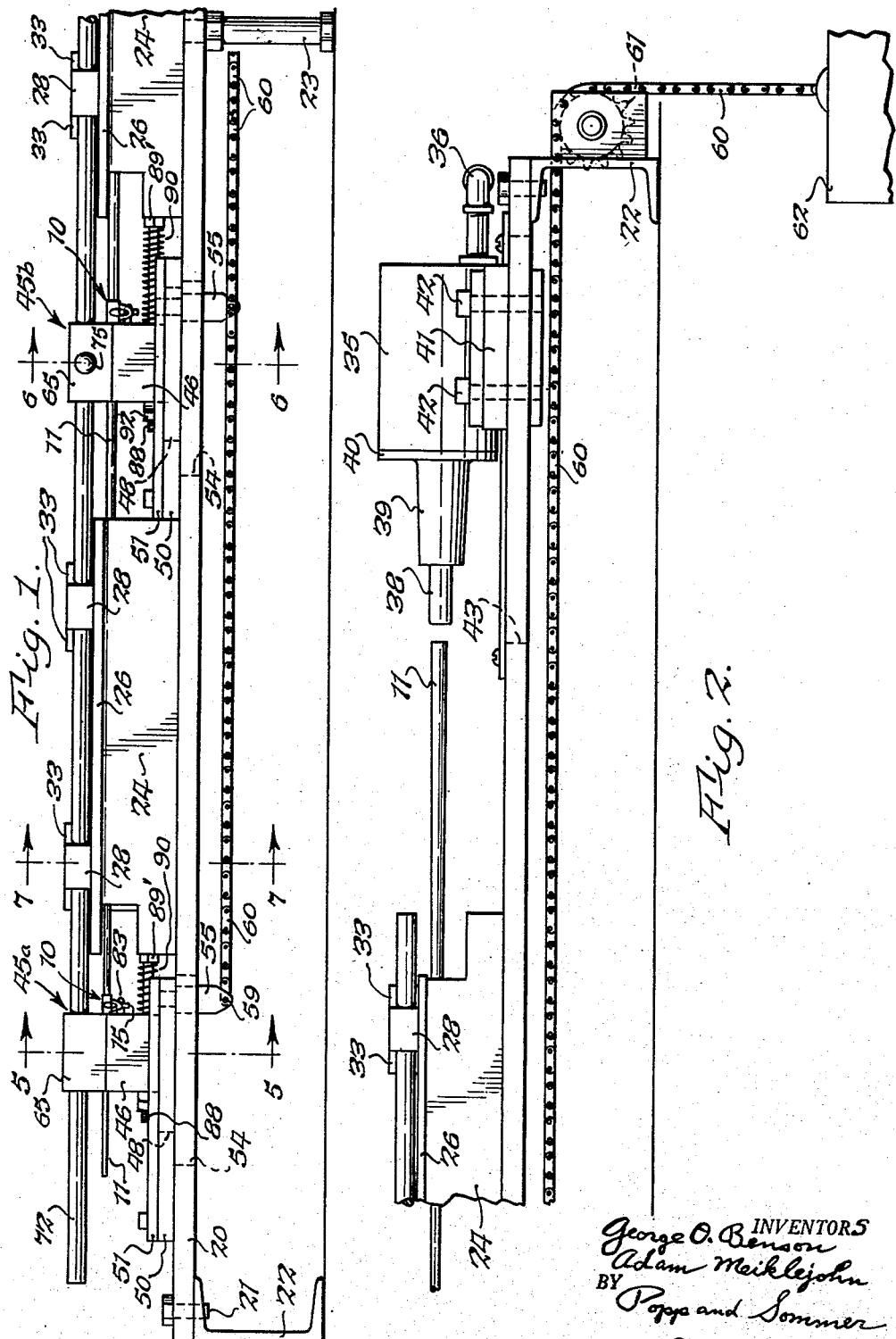

July 2, 1957  G. O. BENSON ET AL  2,797,475
METHOD AND APPARATUS FOR APPLYING CYLINDRICAL SHEET
METAL FITTINGS TO TAPERED RODS
Filed Sept. 16, 1953  3 Sheets-Sheet 2

INVENTORS
George O. Benson
Adam Meiklejohn
BY
Popp and Sommer
Attorneys.

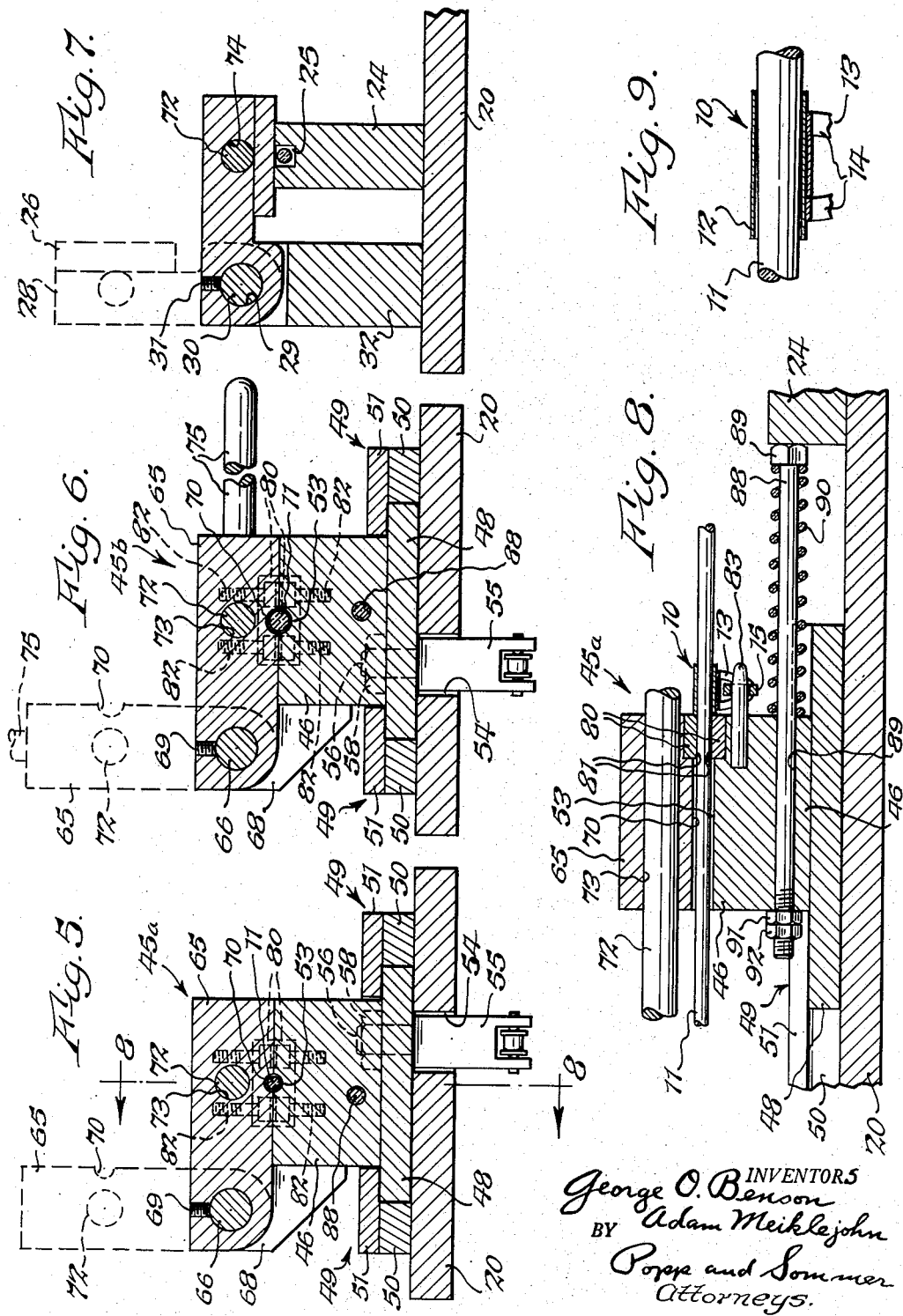

United States Patent Office 2,797,475
Patented July 2, 1957

2,797,475

METHOD AND APPARATUS FOR APPLYING CYLINDRICAL SHEET METAL FITTINGS TO TAPERED RODS

George O. Benson, Youngstown, and Adam Meiklejohn, Niagara Falls, N. Y., assignors to Chisholm-Ryder Co., Inc., Niagara Falls, N. Y., a corporation of New York Application September 16, 1953, Serial No. 380,419

7 Claims. (Cl. 29—525)

This invention relates to method and apparatus for applying cylindrical sheet metal fittings to tapered rods and is more particularly illustrated in conjunction with the application of a plurality of line guides on a tapered fishing rod.

The conventional method of putting multiple mountings, such as line guides, on a tapered glass or metal fishing rod is to temporarily attach the line guide to the rod by cement or tape following which the line guide is wrapped on with thread or wire wound around the line guide and rod.

One of the principal objects of the present invention is to simplify the mounting of line guides on tapered fishing rods by eliminating any preliminary taping or cementing as well as any subsequent thread or wire wrapping and instead substitute a single force fit operation for securing the line guides.

Another important object is to provide such a method in which a plurality of line guides can be secured to the fishing rod at properly spaced intervals in one force fit operation for all of the line guides.

Another aim is to provide for such simultaneous application of a multiplicity of line guides in such manner that each line guide is forced onto the rod with the proper pressure and without danger of distorting of the fishing rod through buckling of the same.

Another purpose is to provide such a method in which compensation is made for normal tolerance variations both in the fishing rods and also in the sleeves of the line guides which sleeves are force fitted on the tapered rods.

Another purpose is to provide such a method and apparatus in which the line guides to be applied to the rods have cylindrical attaching portions which are, however, enlarged to frusto-conical form when forced on the tapered rod so that full contact is provided between the interiors of the several line guides and the exterior of the fishing rod. In addition to the lower initial cost of such initially cylindrical attaching portions of the guides, it is also immaterial as to whether they are fitted on the tapered fishing rod from any particular end of the cylindrical attaching portion.

Another purpose is to provide such a method and apparatus by which the eyes of the several line guides are all readily brought to exact alinement.

Another purpose is to provide such a method and apparatus which is very rapid in action to permit rapidly applying line guides to a succession of fishing rods and which at the same time insures that the several line guides are in proper alinement and with the line guides fitted with the required degree of accuracy and tightness.

Another purpose is to provide such apparatus which is readily adjustable to apply different sizes and numbers of line guides as well as to apply them to different sizes of tapered fishing rods at different places.

Other objects and advantages of the invention will be apparent from the following description and drawings in which:

Fig. 1 is a side elevational view of one end of a machine embodying and arranged to practice the present invention, the machine being shown as having a fishing rod and its line guides mounted thereon, the parts being positioned preparatory to force fitting the guides on the rod.

Fig. 2 is a similar view of the other end of the machine, Figs. 1 and 2 being continuations of each other.

Figs. 5, 6 and 7 are enlarged transverse sectional views taken on the correspondingly numbered lines on Fig. 1. Fig. 7 is typical of several rod holders along the machine and which releasably hold the fishing rod at several points against buckling.

Fig. 8 is a fragmentary longitudinal section taken generally on line 8—8, Fig. 5.

Fig. 9 is a further enlarged fragmentary side elevational view of fishing rod and showing, in section, the cylindrical attaching portion of a line guide, this line guide being positioned preparatory to being force fitted on the rod.

Figure 3:
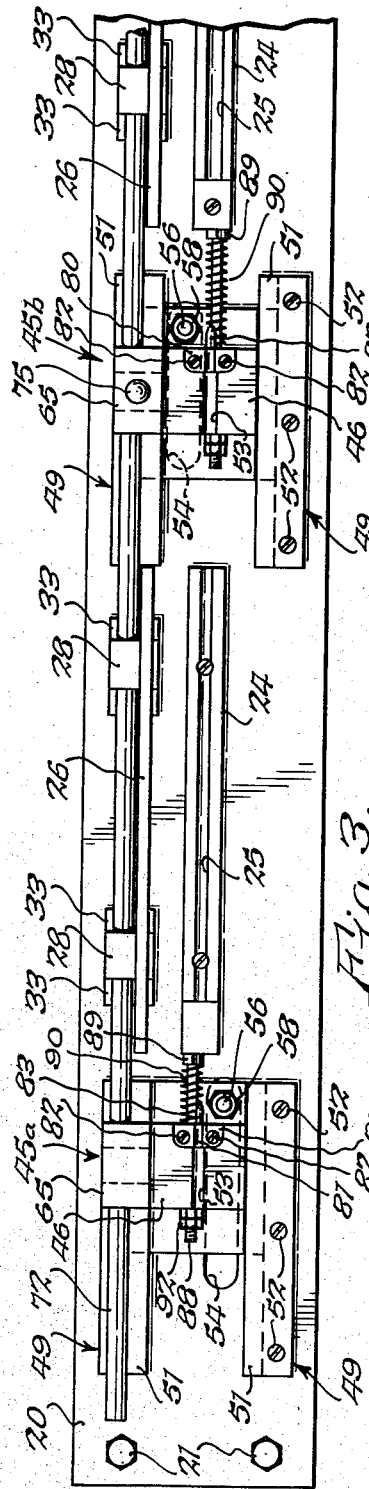
Fig. 3 is a top plan view of the end of the machine shown in Fig. 1, the parts being positioned to receive a fishing rod and the line guides to be applied thereto.

The present invention is directed to force fitting, simultaneously, a plurality of line guides 10 on a tapered fishing rod 11 which can be made of glass or steel. Each line guide 10 has, in its initial or unmounted condition, a cylindrical sheet metal attaching portion 12 which is initially fitted around the rod 11 and then forced axially lengthwise of the rod toward its enlarged end so as to be distorted into frusto-conical form and so as to have full internal area contact or surface contact with the rod. To each cylinder 12 can be attached an eye 13 of any suitable form, this structure being shown as comprising a pair of integral arms 14 having their joint base suitably soldered to the cylindrical sleeve 12 and jointly carrying a ring 15 which can be soldered to the arms 14 so that its axis is parallel with the rod 11.

The required number of these line guides 10 are manually threaded on the fishing rod 11. The line guides are identical except as to size, that with the largest cylindrical attaching portion 12 being fitted on the butt end of the rod the guides with progressively smaller diameter cylindrical attaching portions 12 being fitted along the taper of the rod in accordance with their sizes. For simplicity it is assumed that two line guides 10 are to be fitted to the rod 11, that with the larger cylindrical portion 12 to the butt end of the rod and that with the smaller cylindrical portion 12 to the thin end of the rod.

The apparatus for practicing the present invention is shown as comprising a long base plate 20 which is rectangular in cross section and secured at both ends by screws 21 to transverse base channels 22 while its center is shown as supported by a pair of legs 23. Mounted on this base plate 20 are a pair of upstanding blocks 24 which extend lengthwise of the base plate and have their upper faces coplanar and longitudinally grooved, as indicated at 25. The longitudinal grooves are in line with each other and receive the fishing rod 11 so as to prevent the fishing rod from buckling sidewise while the line guides 10 are being force fitted thereon.

To prevent such buckling in an upward direction the upper grooved face of each block is covered or capped while the line guides are being applied. To this end a rectangular capping or cover plate 26 is hingedly mounted to engage the upper grooved face of each block 24, each of these rectangular capping or cover plates 26 being secured to the free ends of a pair of hinge arms 28 each of which, as best shown in Fig. 7 have a horizontal bore 29 through which a hinge pin 30 extends, an individual hinge pin being provided for each hinge arm 26 and being fastened thereto by a set screw 31. Each hinge pin 30 is journalled in a bearing block 32 at each hinge arm 28 and which bearing block has upwardly projecting bearings 33 in which the pin 30 is journalled and which embrace the corresponding hinge arm 28.

Means are provided for applying axial pressure to the butt end of the fishing rod 11 arranged in the top face grooves 25 of the blocks 24 for the purpose of forcing the rod axially in the direction of its reducing taper and simultaneously press fitting the cylindrical attaching portions 12 of the several line guides 10 thereon. For this purpose a hydraulic cylinder 35 is mounted at one end of the base plate 20 with its axis coincident with the fishing rod 11 placed in the grooves 25. A line 36 connects with one end head of this cylinder to apply hydraulic pressure and suction to one side of the piston (not shown) in this cylinder for the purpose of projecting and retracting the piston rod 38 thereof. This piston rod reciprocates in a slideway provided in an elongated nose 39 in the other end head 40 of the cylinder, this piston rod being in alinement with the fishing rod 11 placed in the grooves 25. The base 41 of the cylinder 35 can be adjustably secured to the base plate 20 by bolts 42 extending through longitudinal slots 43 in the base plate so that the cylinder 35 can be reset at different longitudinal positions along the base plate 20 to suit the length of the fishing rod being handled.

Each line guide 10 is press fitted on the corresponding part of the tapered fishing rod 11 by a movable holder indicated generally at 45a and 45b. These holders move in response to pressures of the fishing rod against each line guide which would be excessive and possibly damage the line guide were it not for the yielding of the holders. As these line guide holders are substantially identical in construction, the following description of one will be deemed to apply to both and the same reference numerals have been used.

The numeral 46 represents a rectangular base block mounted on a rectangular base plate 48 the edges of which project beyond the base block. The opposite side of this base plate are guided by a pair of rails 49 each consisting of a side guide bar 50 on which is mounted a top guide bar 51, the pairs of top guide bars 51 overhanging the opposite edges of the companion base plate 48. Preferably one top rail or guide bar 51 is removably secured, as by screws 52, as shown in Fig. 3. The rails 49 are all arranged parallel with the major axis of the machine and a central groove 53 in the upper face of each base block 46 is arranged to receive the under half of the fishing rod 11 when the latter is disposed in the grooves 25 of the blocks 24.

Figure 4:
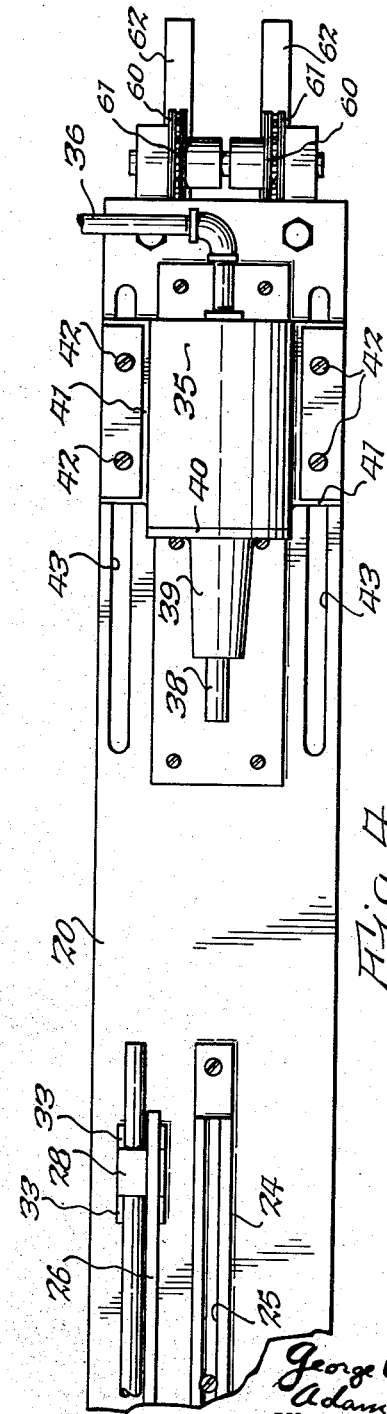
Fig. 4 is a view similar to Fig. 3 of the other end of the machine, Figs. 3 and 4 being continuations of each other.

Each base block 46 is disposed above a slot 54 through the main base plate 20 and which slots 54 extend lengthwise of the major axis of the machine. A finger or bracket 55 projects downwardly through each of these slots 54, each finger being secured to the corresponding base plate by a threaded neck 56 and nut 58. The lower end of each depending finger 55 is bifurcated to support a cross pin 59 and which forms the anchorage for one end of a roller chain 60. As best shown in Figs. 2 and 4, each chain 60 passes over a sprocket 61 at that end of the machine carrying the hydraulic cylinder 35 and below the sprockets 61 each chain connects with a weight 62. Each weight 62 is selected to provide the desired back pressure in force fitting the line guides 10 on the tapered rod 11.

Each base block 46 is removably covered by a top block 65 which is secured through a horizontal hinge pin 66 to ears 68 projecting horizontally from the base block 46. Each top block is shown as fixed to its hinge pin 66 by a set screw 69. Each top block 65 has a groove 70 in its underside which is a counterpart to the top groove 53 in the companion base block 46 and forms, with the groove 53, a bore receiving the tapered fishing rod 11 while the line guides 10 are being applied thereto.

To permit the ready insertion of a fishing rod to be operated on, the two hinge arms 28 are interconnected with the two hinged top plates 65 to swing into and out of operative position in unison and a single handle is provided for swinging all of these parts. For this purpose, the hinge pins 66 for the top plates 65 are in line with the hinge pins 30 for the hinge arms 28 and a common rod 72 extends through horizontal bores 73 in the top plates 65 and through coaxial bores 74 in the hinge arms 28, these bores being parallel with the hinge pins 30, 66. A handle in the form of a rod 75 projects laterally from one of the top plates 65, as best shown in Figs. 1 and 6, and it will be seen that by swinging the handle 75, all of the top plates 65, as well as all of the hinge arms 28, are swung in unison to engage the top faces of the base blocks 46 and blocks 24, respectively, thereby to confine the tapered fishing rod 11 in the grooves 53, 70 and 25, respectively, and similarly all of the top plates 65 as well as all of the hinge arms 28 are swung in unison upwardly away from the top faces of the base blocks 46 and blocks 24, respectively, to permit the removal of the fishing rod from the grooves 53, 25 and the replacement of another fishing rod therein.

Each pair of base blocks 46 and top plates 65 carries a pair of hardened mating inserts 80, 80 against which one end of the cylindrical part 12 of the corresponding line guide is pressed to force it onto the tapered fishing rod. Each of these hardened inserts is in the form of a small generally rectangular block fitted in a correspondingly rectangular recess, this recess forming a continuation of one end of the groove 53 of each base block 46 and of the same end of the groove 70 of each top plate 65. These mating inserts 80, 80 are at the ends of the grooves 53, 70 adjacent the hydraulic cylinder 35 and have mating semicylindrical recesses 81, 81 the diameter of which is less than the outside diameter of the cylindrical part 12 of the corresponding line guide 10. Each hardened insert 80 is secured in its rectangular recess by a pair of screws 82.

It is important, of course, that the eyes 15 of the line guides be in alinement on the fishing rod 11. To insure such alinement, an alinging pin 83 is mounted in each base block 46 to project from that vertical face of the base block which is recessed, as best shown in Fig. 8 to receive the corresponding hardened insert 80. The pins 83 are in axial alinement with each other and the eyes 15 of the line guides 10 are fitted over these pins as also shown in Fig. 8.

To cushion the return movement of each line guide holder 45a, 45b following the press fitting of its line guide 10 on the fishing pole 11 a spring loaded return bumper is provided. As best shown in Fig. 8, each of these spring loaded bumpers comprises a bolt 88 slidably mounted in a bore 89 in the corresponding base block 46 and which bore is parallel with the line of movement of this base block and in alinement with the corresponding block 24. The head 89' of each bolt is arranged to engage the corresponding block 24 as best shown in Fig. 8, and a helical compression spring 90 urges each head 89' toward its block 24. A nut 91 and lock nut 92 prevents the bolt 88 from being projected from the bore 89 by the helical compression spring 90.

In the use of the apparatus as above described, at the start of the operation the piston rod 38 of the hydraulic cylinder 35 is retracted and the handle 75 is vertically disposed as shown in Fig. 3 so that the several top plates 65 and hinge arms 28 are in the opened upright positions shown in Figs. 3 and 4 and by broken lines in Figs. 5, 6 and 7.

The operator then threads the cylindrical parts 12 of a pair of line guides 10 on a tapered fishing rod 11 and brings these line guides to the approximate position they will ultimately occupy on the rod, this being done by moving them along the rod until they bottom. Of course, the cylindrical part 12 of that line guide 10 nearest the butt end of the tapered fishing rod 11 is larger in diameter than the cylindrical part of that line guide nearest the tip end of the tapered fishing rod.

The fishing rod 11 is then placed in the grooves 25 of the two blocks 24 and also in the grooves 53 of the two base blocks 46. The eye of each of the line guides 10 is then brought into alinement with the corresponding alinement pin 83 and is slipped over this alinement pin as shown in Fig. 8. This insures that on the fishing rod the eyes 15 will be in alinement with each other.

The operator then seizes the handle 75 (Figs. 1, 3 and 6) and swings it downwardly to a horizontal position. This swings the top plate 65 carrying this handle 75 into engagement with the top face of its base block 46 and since all of the top plates 65 and hinge arms 28 are interconnected by the rod 72, which impales all of these parts, to swing in unison, this lowering of the handle 75 causes both of the top plates to engage the top faces of the base blocks 46 and also causes both of the hinge arms 28 to engage the top face of the block 24. Accordingly the tapered fishing rod is confined in the two grooves 25 of the blocks 24 by the hinge arms 28 as shown in Fig. 7 and is also confined in the mating grooves 81 of the hardened inserts 80 by the top plates 65 as best shown in Figs. 5, 6 and 8.

The operator then admits fluid under pressure to the hydraulic cylinder 35 to cause the piston rod 38 to be projected and engage and push against the butt end of the tapered fishing rod 11. This pushes the fishing rod longitudinally in its diminishing direction of taper. This causes the taper of the fishing rod to engage forcibly with one end of the cylindrical part of each line guide and to force the opposite end thereof against the corresponding pair of hardened inserts 80, 80. This longitudinal movement of the fishing rod 11 by the hydraulic plunger 38 is continued until the cylindrical part 12 of each line guide 10 is forced along the enlarging taper of the fishing rod with such force that the cylindrical part is deformed into frustoconical form with full internal face contact with the tapered fishing rod 11.

To prevent excessive or rupturing forces against the cylindrical part 12 of each line guide 10, when the back pressure of either pair of hardened inserts 80 against the cylindrical part 12 of the corresponding line guide 10 approaches such excessive value, the line guide 10 moves the entire holder 45a or 45b against which it is being pressed. Thus this approaching excessive pressure exerted against either pair of hardened inserts 80 (Fig. 8) causes the base block 46, base plate 48 and top plate 65 of the corresponding line guide holder 45a or 45b to move along its track 49 and through its chain 60, to lift its weight 62. By providing such yieldingly resisted movement of each line guide holder 45a and 45b, the cylindrical part 12 of each line guide 10 is press fitted on the tapered fishing rod 11 with the proper pressure to insure its distortion into frusto-conical form with full surface contact with the rod 11 with the proper pressure to insure its distortion into frusto-conical form with full surface contact with the rod 11 but without danger of rupturing the cylindrical part 12 of the line guide in spite of the tolerance variations of both the line guides and the fishing poles. With the compensation provided by the yieldingly resisted movement of the line guide holders 45a, 45b, the line guides 10 are not, or course, all applied to the fishing rod 11 at the same locations but are applied at the locations determined by the back pressure of each line guide holder 45a or 45b against the cylindrical part of each line guide.

After the line guides 10 have been so force or press fitted on the fishing rod 11, the operator regulates the pressure fluid to the hydraulic cylinder 35 to retract the plunger 38 and hence relieve the pressure against the butt end of the fishing rod 11. The operator then seizes and lifts the handle 75. This raises the corresponding top plate 65 about its hinge pin 66 to the broken line position shown in Fig. 6 and since this top plate 65 is interconnected with the other top plate 65 and also with the two hinge arms 28 by the rod 72, this raises all of the top plates 65 and hinge arms 28 to the upright positions shown in Figs. 1 and 2 and also by broken lines in Figs. 5, 6 and 7.

The operator then removes the fishing rod 11 with the line guides 10 press fitted thereon, this bringing the parts to the condition assumed at the start of this description of operation.

From the foregoing it will be seen that the present invention provides for the low cost and rapid application of cylindric parts of line guides to a fishing rod in such manner that they are distorted into full surface fitting frusto-conical form but without danger of upturning the line guides. It will also be seen that the invention achieves the various other objects and advantages set forth.

We claim:

1. The method of applying a plurality of cylindrical fittings of different sizes concentrically around a tapered rod, said rod and fittings having normal tolerance variations, which comprises threading said fittings on said rod with the larger size toward the butt end of the rod, yieldingly holding each of said fittings against axial movement in the direction of reducing taper of said rod, and moving said rod axially in the direction of reducing taper thereof and with sufficient force to distort each of said cylindrical fittings into frusto-conical form and having substantially full internal surface contact with said tapered rod, the yielding resistance so applied against such axial movement of said fittings being such as to prevent rupture of said fittings and the spacing of said fittings along said rod being thereby finally determined by said tolerance variations.

2. The method of applying a plurality of line guides to a tapered fishing rod, each of said line guides comprising a cylindrical part adapted to embrace the fishing rod and an eye carried by said cylindrical part with its axis in generally parallel but eccentric relation to the axis of said cylindrical part, said cylindrical parts being of different sizes with said cylindrical parts and rod having normal tolerance variations which comprises threading said cylindrical parts of said fittings on said rod with the larger size toward the butt end of the rod, turning said cylindrical parts about their axis to bring the eyes thereof into alinement with each other, yieldingly holding each of said cylindrical parts against axial movement in the direction of reducing taper of said rod, and moving said rod axially in the direction of reducing taper thereof and with sufficient force to distort each of said cylindrical parts into frusto-conical form and having substantially full internal surface contact with said tapered rod, the yielding resistance so applied against such axial movement of said cylindrical parts being such as to prevent rupture of said cylindrical parts, the spacing of said line guides along said rod being thereby finally determined by said tolerance variations.

3. Apparatus for applying a plurality of tubular fittings of different sizes concentrically around a tapered rod and said rod and fittings having normal size variations, which comprises a base, a pair of spaced holders on said base and having alining through channels arranged to receive jointly said tapered rod, the side of each of said holders facing the butt end of said tapered rod being adapted to engage the end of a corresponding one of said tubular fittings with the larger size of said fittings toward the butt end of said rod, means arranged to move said rod axially in the direction of reducing taper thereof and with sufficient force to force each of said tubular fittings into substantially full internal surface contact with said rod, and means yieldingly holding each of said holders against movement in response to such movement of said rod, the yielding resistance so applied against such axial movement of said fittings being such as to prevent rupture thereof and said yielding resistance also serving to finally determine the spacing of said fittings along said rod in response to said tolerance variations.

4. Apparatus for applying a plurality of sheet metal cylindrical fittings of different sizes around a tapered rod and said rod and fittings having normal size variations, which comprises a base, a pair of spaced holders on said base and having alining through bores arranged to receive jointly said tapered rod, said bores being each smaller than the external diameter of the corresponding cylindrcal fitting and the side of each of said holders facing the butt end of the rod being adapted to engage the end of a corresponding one of said fittings with the larger size of said fittings toward the butt end of said rod, means arranged to move said rod axially in the direction of reducing taper thereof and with sufficient force to distort each of said cylindrical fittings into frusto-conical form and having substantially full internal surface contact with said rod, and means yieldingly holding each of said holders against movement in response to such movement of said rod, the yielding resistance so applied against such axial movement of said fittings being such as to prevent rupture thereof and said yielding resistance also serving to fianlly determine the spacing of said fittings along said rod in response to said tolerance variations.

5. Apparatus for applying a plurality of sheet metal cylindrical fittings of different sizes concentrically around a tapered rod and said rod and fittings having normal size variations, which comprises a base, a pair of base blocks on said base with one face of each base block being in alinement with each other, a top plate hinged to each of said base blocks to swing into and out of engagement with the said one face thereof, at least one of the opposing faces of each base block and top plate being grooved and with said grooves being in alinement with each other and adapted to receive jointly said tapered rod, the side of each of said holders facing the butt end of said tapered rod being adapted to engage the end of a corresponding one of said cylindrical fittings with the larger size of said fittings toward the butt end of said rod, means arranged to move said rod axially in the direction of reducing taper thereof and with sufficient force to distort each of said cylindrical fittings into frusto-conical form and having substantially full internal surface contact with said rod, and means yieldingly holding each of said base blocks against movement in response to such movement of said rod, the yielding resistance so applied to such axial movement of said fittings being such as to prevent rupture thereof and said yielding resistance also serving to finally determine the spacing of said fittings along said rod in response to said tolerance variations.

6. Apparatus as set forth in claim 5 wherein the hinge axes of said top plates are coaxial and wherein said top plates are impaled by a rod compelling said top plates to be moved toward and from their base blocks in unison.

7. Apparatus as set forth in claim 5 wherein each of said base blocks is movably mounted on a track secured to said base to extend lengthwise of said rod and wherein each of said base blocks is provided with a spring loaded bumper to cushion its return movement.

References Cited in the file of this patent

UNITED STATES PATENTS

| | | |
|---|---|---|
| 1,907,656 | Oldberg | May 9, 1933 |
| 2,219,266 | Hirsch | Oct. 22, 1940 |
| 2,226,702 | Berger | Dec. 31, 1940 |
| 2,290,619 | Rieger | July 21, 1942 |
| 2,325,929 | Amesbury | Aug. 3, 1943 |
| 2,333,120 | Parker | Nov. 2, 1943 |
| 2,464,908 | Volkmann | Mar. 22, 1949 |